Nov. 7, 1967
D. L. HERBERT
3,351,214
SHEAR BOLT
Filed June 25, 1962
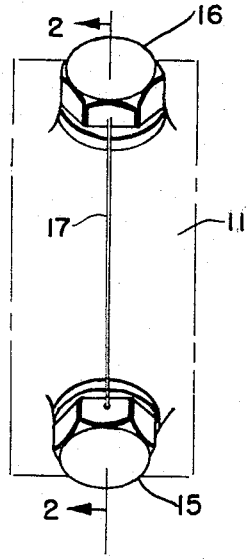
Fig. 1
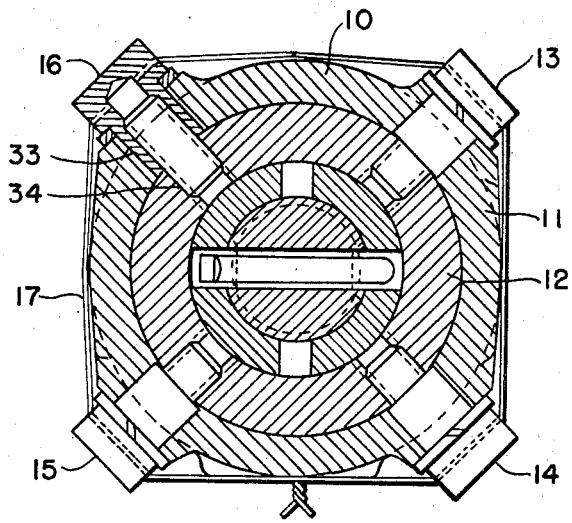
Fig. 2
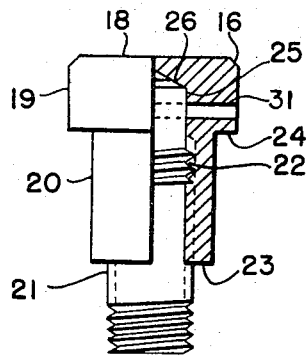
Fig. 3
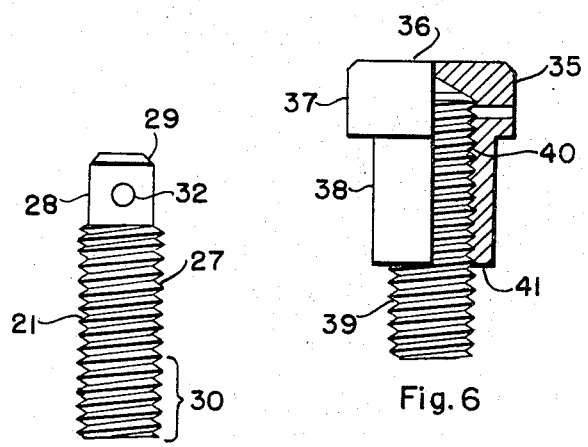
Fig. 5
Fig. 6
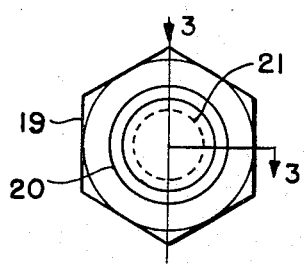
Fig. 4
*INVENTOR.*
DONALD L. HERBERT
BY
*Kenneth W. Miller*
ATTORNEY.

United States Patent Office 3,351,214
Patented Nov. 7, 1967

3,351,214
SHEAR BOLT
Donald L. Herbert, Mansfield, Ohio, assignor to The Ohio Brass Company, Mansfield, Ohio, a corporation of New Jersey
Filed June 25, 1962, Ser. No. 204,902
11 Claims. (Cl. 213—9)

This invention relates to shear bolts and more particularly to a shear bolt and improved mounting means therefor.

A principal object of the invention is to facilitate removal of partially sheared shear bolts.

Another object of the invention is to provide an improved bushing and mount for shear bolts.

In using shear bolts for overload release in mechanisms and machinery of all kinds, some problems are encountered in the case of an overload which results only in a partial shear of the bolt or pin. In such circumstances, it has heretofore been necessary to completely shear the bolt by some artificial means or to resort to elaborate and time-consuming procedures for removing the partially sheared bolt or pin from the slide and carrier members, by drilling out the portions of the partially sheared bolt.

According to the present invention, there is provided an arrangement and device whereby direct removal of the partially sheared bolt from the slide may be accomplished by means of a wrench or by tapping an axial opening in the partially sheared bolt to permit application of a tap and a reverse threaded stud removing device.

The improved shear bolt is in two parts, a cap having a head and sleeve with a central threaded opening and a stud which screws into the threaded opening. The sleeve is approximately as long as the thickness of the wall of the carrier to which the shear bolt is to be applied, whereas the exposed end of the stud is threaded into the slide. The stud is locked into the cap.

In case of an overload resulting in a partial shear, the lock between the cap and the stud is removed and the cap is turned from the stud, leaving the partially sheared stud exposed in the opening in the casing. The stud can then be removed from the slide, since the opening in the casing is sufficiently large to permit turning of the offset portion of the stud about the axis defined by that portion of the stud which is threaded in the slide. The diameter and thickness of the sleeve may be designed to accommodate the maximum probable partial shear of the stud.

The invention, together with further features, objects and advantages thereof, will be more fully understood by reference to the following description and claims taken in connection with the appended drawings, in which FIG. 1 shows an exterior elevation view of an apparatus embodying shear bolts in accordance with the invention;

FIG. 2 shows a vertical sectional view taken in the direction 2—2 in FIG. 1;

FIG. 3 shows a view, partly in section, of the cap and stud of the combined shear bolt of the invention;

FIG. 4 shows a stud end view of the shear bolt;

FIG. 5 is an elevation view of the stud; and

FIG. 6 shows a shear bolt which is an alternate embodiment of the invention.

Referring to FIG. 1 and FIG. 2, there is shown an apparatus, such as a releasing coupler according to U.S. Patent 2,802,580, illustratively embodying a shear bolt in accordance with the invention. In the apparatus 10, a casing 11 carries a slide member 12 which is normally fixed to the casing by four shear bolts 13, 14, 15 and 16, extending radially through the casing and threaded into the slide member 12. The shear bolts are held in locked relation to the casing 11 and slide member 12 by a tie-wire 17.

The slide member 12 is normally held in fixed relation to the casing 11 by the shear bolts 13 to 16. Because of axial or rotational loads greater than the design load, the shear bolts function as an overload release permitting relative axial or rotational movement of the members and preventing damage to the members.

The shear bolts 13 to 16 are illustrated in greater detail in FIG. 3, wherein the shear bolt 16 is illustrated in an enlarged quarter-section view. As there shown, the bolt 16 comprises a cap 18 including a head 19 and a sleeve 20, and a stud 21. The cap 18 is formed as a unitary part of steel with the head 19 in hexagonal form for receiving a wrench, as illustrated in FIG. 4.

The sleeve 20 comprises a hollow cylindrical piece which is integral with and extends from one side of the head 19. The sleeve 20 is formed with a thread 22 in the interior wall thereof from the end 23 of the sleeve to adjacent the plane of the face 24 of the head 19. The head 19 has a smooth bore 25 extending from the plane of the face 24 into the head and having a diameter not greater than the diameter of the crest of the threads 22. The bore 25 terminates in conical face 26.

The stud 21 is formed as a unitary steel part having a threaded portion 27 adapted to be received in threaded engagement with the sleeve 20. An end 28 thereof is machined with a smooth cylindrical exterior surface to fit into the smooth bore 25 in the head 19 of the cap, and a face 29 to bear against the face 26 of the head. The threaded end 30 projects beyond the end 23 of the sleeve 20.

The head 19 of the cap 18 and the end 28 of the stud 21 are drilled with openings 31 and 32, respectively, arranged so that the openings are in alignment when the face 29 of the stud is seated upon the face 26 of the head. A removable locking means, such as the wire 17 or a metal clinch pin, is provided for holding the cap and stud together.

In use, the shear bolt is inserted through the opening 33 in the casing 11, and the stud 21 is turned into a threaded opening 34 in the slide member 12 until the desired tension has been applied. When the apparatus 10 is subjected to an overload, such that the stud 21 is partially sheared along the adjoining surfaces of the casing 11 and slide member 12, the wire 17 is removed and the cap 18 is removed from the stud 21 and from the opening 34 by reverse turning thereof against the thread of the stud. When the cap 18 has been removed, the stud 21 can be turned in the opening 33 by applying a suitable gripping means to the end 28 of the stud. The thickness of the sleeve 20 and the size of the opening 33 should, of course, be designed in relation to the maximum shear deformation of the stud 21 without separation thereof into two parts along the shear line.

The shear bolt illustrated in FIG. 6 is similar to the shear bolt 16 but in simplified form. As shown, the shear bolt 35 includes a cap 36 comprising a head 37, a sleeve 38, and a stud 39. The head 37 and sleeve 38 are provided with a uniform opening 40 extending from the end 41 into the head 37, with a thread 42 along the entire extent thereof. Accordingly, the stud 39 and cap 36 are uniformly dimensioned and threaded along the length thereof and manufacturing operations are facilitated. The stud 39 can be locked in the cap 36 by interference fit, excess tightening, or by use of a lock pin, as in the embodiment of FIGS. 3 to 5.

The invention contemplates arrangements wherein the stud extends through an opening in the carrier member and is secured thereto by a nut or other fastener on the far side thereof.

It is to be understood that the foregoing description is not intended to restrict the scope of the invention and that various rearrangements of the parts and modifications of the design may be resorted to. The following claims are directed to combinations of elements which embody the invention or inventions of this application.

What is claimed is:

1. In combination, two adjacent relatively movable load carrying members and a shear bolt connecting the said two members and arranged perpendicular to the direction of movement of the two members during overload release, the shear bolt including a cap comprising a head and a tubular sleeve projecting from the head, the said sleeve being received in an opening in one of the members and the head overlying the exterior surface of said member, and a stud threaded into the said sleeve and received in the remaining member, all for separate removal of the cap from the said opening to facilitate removal of the stud from the said remaining member through the said opening.

2. Apparatus in accordance with claim 1, in which the head has a part thereof aligned with the opening of the sleeve and an end face on the stud bears upon the said part of the head, and a detachable securing means extends transversely through the head and the stud.

3. Apparatus in accordance with claim 1, in which the stud is threaded into the said remaining member.

4. A shear bolt including a cap comprising a head and a cylindrical sleeve projecting therefrom and having a lesser external diameter than the head, and a stud carried by the cap and received in said sleeve in threaded engagement therewith along at least a portion of the interior extent of the sleeve and head, the stud projecting beyond the end of the sleeve and having a smooth end thereof received in a smooth bore in the said head, an end face on the stud bearing against the head.

5. A shear bolt in accordance with claim 4 with means extending transversely through the head of the cap and the end of the stud for detachably locking the stud in the cap.

6. Railway draft rigging comprising a housing having a pocket containing cushioning means, means in said pocket forwardly of a rear end thereof for backing said cushioning means under buffing forces, and releasing means normally connecting said backing means to said housing against rearward movement in said pocket, said releasing means including internally threaded bushing means removably disposed in aperture means in said housing, and shear pin means threaded into said bushing means and extending therefrom into said backing means.

7. Railway draft rigging comprising a housing having a pocket containing cushioning means, means in said pocket forwardly of a rear end thereof for backing said cushioning means under buffing forces, and releasing means normally connecting said backing means to said housing against rearward movement in said pocket, said releasing means including a plurality of internally threaded bushings removably disposed in apertures in a side wall of said pocket, and a shear pin threaded into each bushing and extending therefrom into a side of said backing means.

8. Draft rigging comprising a housing having a pocket containing cushioning means, a backing member in said pocket forwardly of a rear wall thereof for backing said cushioning means under buffing forces, and releasing means normally connecting said backing member to said housing against rearward movement in said pocket, said releasing means including a plurality of internally threaded bushings each removably disposed in an aperture in a side wall of said pocket, and a shear pin threaded into each bushing and extending therefrom into a side of said backing member.

9. Draft rigging comprising a housing having a pocket containing cushioning means, a backing member slidably mounted in said pocket forwardly of a rear wall thereof for backing said cushioning means under buffing forces, and releasing means normally connecting said backing member to said housing against rearward movement in said pocket, said releasing means including a plurality of internally threaded bushings, each removably disposed in an aperture in a side wall of said pocket and a shear pin threaded into each bushing and extending therefrom into a side of said backing means.

10. In draft rigging including a yoke and a coupler pivotally connected thereto, the improvement comprising a drawbar having a pocket containing cushioning means, said yoke extending rearwardly into said pocket through said cushioning means and supported forwardly thereof in a front bearing fixed to said drawbar, a bearing member slidably mounted in said pocket forwardly of a rear wall thereof, said bearing member backing said cushioning means under buffing forces and being a rear bearing for said yoke, and releasing means normally connecting said bearing member to said drawbar against rearward movement in said pocket, said releasing means including a plurality of internally threaded bushings each removably disposed in an aperture in a side wall of said pocket, and a shear pin for each bushing having an outer part threaded thereinto and an inner part socketed in a side of said bearing member.

11. Railway draft rigging comprising a housing having a pocket containing cushioning means, a backing member mounted in said pocket forwardly of a rear wall thereof for rearward movement therein and backing said cushioning means under buffing forces, and releasing means normally securing said backing member to said housing against rearward movement in said pocket, said releasing means including an internally threaded headed bushing removably disposed from without in an aperture in a side wall of said pocket, and a shear pin having an outer part threaded from within into said bushing and an inner part socketed in a side of said backing member.

References Cited

UNITED STATES PATENTS

| | | | |
|---|---|---|---|
| 1,381,437 | 6/1921 | Smith | 85—35 |
| 2,355,901 | 8/1944 | Beede | 151—33 |
| 2,384,188 | 9/1945 | Mercier | 64—28 |
| 2,802,580 | 9/1957 | Larsson | 64—28 X |

FOREIGN PATENTS 607,745   9/1948   Great Britain.

ARTHUR L. LA POINT, *Primary Examiner.*

RICHARD W. COOKE, *Examiner.*

D. E. HOFFMAN, *Assistant Examiner.*